(12) United States Patent
Pela et al.

(10) Patent No.: US 11,015,094 B2
(45) Date of Patent: May 25, 2021

(54) POLYURETHANE ADHESIVES FOR BONDING LOW SURFACE ENERGY FILMS

(71) Applicants: Henkel AG & Co. KGaA, Dusseldorf (DE); Henkel IP & Holding GmbH, Dusseldorf (DE)

(72) Inventors: Roberto Pela, Dusseldorf (DE); Hans-Georg Kinzelmann, Pulheim (DE); Yongxia Wang, Bridgewater, NJ (US); Thomas Kamm, Cologne (DE)

(73) Assignees: Henkel IP & Holding GmbH, Duesseldorf (DE); Henkel AG & Co. KGaA, Duesseldorf (DE)

(*) Notice: Subject to any disclaimer, the term of this patent is extended or adjusted under 35 U.S.C. 154(b) by 333 days.

(21) Appl. No.: 15/658,562

(22) Filed: Jul. 25, 2017

(65) Prior Publication Data

US 2017/0321095 A1 Nov. 9, 2017

Related U.S. Application Data

(63) Continuation of application No. PCT/EP2016/051945, filed on Jan. 29, 2016.

(30) Foreign Application Priority Data

Feb. 3, 2015 (EP) ..................................... 15153614

(51) Int. Cl.

| | | |
|---|---|---|
| *B32B 27/08* | (2006.01) | |
| *C08G 18/12* | (2006.01) | |
| *C08G 18/36* | (2006.01) | |
| *C08G 18/48* | (2006.01) | |
| *C09J 175/14* | (2006.01) | |
| *C09J 5/04* | (2006.01) | |
| *C08G 18/62* | (2006.01) | |
| *C08G 18/69* | (2006.01) | |
| *C08J 5/12* | (2006.01) | |
| *C08G 18/76* | (2006.01) | |
| *C08G 18/40* | (2006.01) | |
| *C09J 175/04* | (2006.01) | |
| *C08G 18/42* | (2006.01) | |
| *B32B 7/12* | (2006.01) | |
| *B32B 27/32* | (2006.01) | |
| *C09J 5/00* | (2006.01) | |

(52) U.S. Cl.

CPC ............... *C09J 175/14* (2013.01); *B32B 7/12* (2013.01); *B32B 27/08* (2013.01); *B32B 27/32* (2013.01); *C08G 18/12* (2013.01); *C08G 18/36* (2013.01); *C08G 18/4063* (2013.01); *C08G 18/4216* (2013.01); *C08G 18/4808* (2013.01); *C08G 18/6208* (2013.01); *C08G 18/698* (2013.01); *C08G 18/7657* (2013.01); *C08G 18/7671* (2013.01); *C08J 5/121* (2013.01); *C08J 5/124* (2013.01); *C09J 5/00* (2013.01); *C09J 5/04* (2013.01); *C09J 175/04* (2013.01); *C08J 2323/06* (2013.01); *C08J 2323/12* (2013.01); *C09J 2475/00* (2013.01)

(58) Field of Classification Search
CPC .... C08G 18/0823; C08G 18/10; C08G 18/12; C08G 18/48; C08G 18/66; C08G 18/7675; C08G 18/698; C08G 18/4018; C08J 175/04; C08J 175/06; C08J 175/08
USPC ...................................... 528/59, 60; 521/159
See application file for complete search history.

(56) References Cited

U.S. PATENT DOCUMENTS

| | | | |
|---|---|---|---|
| 5,804,300 A * | 9/1998 | Maro | ...................... B32B 27/08 156/244.11 |
| 6,077,925 A * | 6/2000 | Gerard | ................... C08G 18/10 525/127 |
| 7,163,741 B2 | 1/2007 | Khandpur et al. | |
| 8,017,677 B2 | 9/2011 | Ikeda et al. | |
| 8,575,280 B2 | 11/2013 | Uchida et al. | |
| 2003/0009049 A1* | 1/2003 | Smith | .................... C08G 18/10 560/26 |
| 2005/0065276 A1 | 3/2005 | Burckhardt et al. | |

(Continued)

FOREIGN PATENT DOCUMENTS

| | | |
|---|---|---|
| DE | 102004018048 A1 | 11/2005 |
| EP | 0383505 A2 | 8/1990 |

(Continued)

OTHER PUBLICATIONS

Product Bulletin—Hydroxyl-terminated Polybutadiene Resins and Derivatives—Poly bd® and Krasol™ published by Cray Valley and available online at web.archive.org/Web/20120615000000*/http://www.crayvalley.com/docs/technical-paper/cray_valley_poly-bd-krasol-prod-bulletin.pdf on Sep. 16, 2012 (Year: 2012).*

(Continued)

*Primary Examiner* — Lee E Sanderson
(74) *Attorney, Agent, or Firm* — James E. Piotrowski

(57) ABSTRACT

The present invention relates to a polyurethane laminating adhesives, methods for producing a multilayer laminate by laminating at least two films with a polyurethane laminating adhesive, and multilayer laminates obtainable by these methods wherein the polyurethane laminating adhesive comprises an NCO-terminated polyurethane prepolymer obtainable by reacting a polyol mixture comprising: 0.1 to 20.0 wt % relative to the total weight of the polyol mixture of at least one polybutadiene polyol; and 5.0 to 99.9 wt % relative to the total weight of the polyol mixture of at least one polyether polyol, wherein the at least one polyether polyol comprises at least one polyether polyol with a number average molecular weight $M_n$ in the range of >1000 g/mol to 10000 g/mol; with at least one polyisocyanate, wherein the at least one polyisocyanate is used in an amount such that the isocyanate groups are present in molar excess relative to the hydroxyl groups of the polyol mixture. Also encompassed are the use of the described adhesives for laminating two or more films, and the multilayer laminates obtainable by the described methods.

16 Claims, No Drawings

(56) References Cited

U.S. PATENT DOCUMENTS

| | | |
|---|---|---|
| 2007/0088145 A1 | 4/2007 | Mgaya et al. |
| 2007/0129525 A1 | 6/2007 | Eichelmann et al. |
| 2011/0098417 A1 | 4/2011 | Worley et al. |
| 2012/0263836 A1 | 10/2012 | Carlson et al. |
| 2013/0241098 A1 | 9/2013 | Anjum et al. |
| 2016/0023445 A1* | 1/2016 | Kulkarni ............... B32B 27/304 |
| | | 206/461 |

FOREIGN PATENT DOCUMENTS

| | | |
|---|---|---|
| EP | 1970394 A1 | 9/2008 |
| JP | H07173245 A | 7/1995 |
| JP | H0967556 A | 3/1997 |
| JP | 2003522249 A | 7/2003 |
| JP | 2006063245 A | 3/2006 |
| JP | 2006096912 A * | 4/2006 |
| JP | 2006096912 A | 4/2006 |
| JP | 2008156572 A | 7/2008 |
| JP | 2013533915 A | 8/2013 |
| JP | 2014205764 A | 10/2014 |
| RU | 2283851 C2 | 9/2006 |
| WO | 9910401 A1 | 3/1999 |
| WO | WO-2006060129 A2 * | 6/2006 ............... B32B 7/12 |
| WO | 2009039145 A1 | 3/2009 |

OTHER PUBLICATIONS

International Search Report for International PCT Patent Application No. PCT/EP2016/051945 dated Jun. 13, 2016.
DIN 53240.
DIN 55672.
DIN 55672-1.
DIN EN ISO 11909.
DIN EN ISO 4629.
Principle and Application of Surfactants, Jisheng Yang, p. 59, Southeast University Press, Dec. 31, 2012.
Food Packaging Technology, Han Gao, p. 187, China Science and Technology Press, Aug. 31, 2012.

* cited by examiner

POLYURETHANE ADHESIVES FOR BONDING LOW SURFACE ENERGY FILMS

The present invention is directed to polyurethane laminating adhesives that are based on polybutadiene polyols, methods for laminating two or more films, in particular for bonding low surface energy films, by use of a polyurethane laminating adhesive that is based on polybutadiene polyols, and multilayer laminates obtainable by these methods Laminating adhesives for bonding film-shaped substrates are commonly known in the field and are for example widely used for packaging applications. Adhesives based on reactive polyurethanes have proven particularly successful in practice. For example, DE 10 2004 018048 describes PU adhesives that can be manufactured on the basis of PU prepolymers having terminal isocyanate groups. They are usable for adhesive bonding of films to yield multi-layer composite materials.

While PU adhesives are particularly advantageous for food packaging applications, the known adhesives have a number of drawbacks. In particular, it is nowadays desirable that laminating adhesives for food packaging applications show good adherence on plastic films with low or very low surface energies. Conventionally, the challenges connected thereto are overcome by use of an in-line corona discharge prior to application of the adhesive. However, this corona treatment is often not as effective as desired and, in case standard to medium performance laminates are produced, can also be too expensive. Alternative treatment options, such as atmospheric or vacuum plasma treatments are even more expensive and therefore find almost no application in food packaging.

In some cases, solvent based adhesives are the systems of choice to overcome the challenge of adhering onto low surface energy materials, since the solvent can partially melt the plastic material of the film, therefore helping to obtain slightly higher performance. However, the performance gains are far from satisfying and it is furthermore more desirable to use solvent free adhesive systems for environmental and toxicity reasons.

In view of the existing problems in providing adhesive systems for food packaging applications that show good adhesiveness on low surface energy films, there is still need in the art for adhesives in particular solvent-free adhesives that show improved adhesiveness on low surface energy films and obviate the need for cost-intensive corona discharge or plasma treatments.

The present invention meets this need by providing, in a first aspect, a polyurethane laminating adhesive comprising an NCO-terminated polyurethane prepolymer obtainable by reacting a polyol mixture comprising:
  a. 0.1 to 20.0 wt %, preferably 0.5 to 10.0 wt %, relative to the total weight of the polyol mixture of at least one polybutadiene polyol, preferably a hydrogenated polybutadiene polyol; and
  b. 5.0 to 99.9 wt %, preferably 30.0 to 90.0 wt %, relative to the total weight of the polyol mixture of at least one polyether polyol, wherein the at least one polyether polyol comprises at least one polyether polyol with a number average molecular weight $M_n$ in the range of >1000 g/mol to 10000 g/mol, preferably 1500 to 4000 g/mol;
  with at least one polyisocyanate, preferably at least one di- and/or triisocyanate, wherein the at least one polyisocyanate is used in an amount such that the isocyanate groups are present in molar excess relative to the hydroxyl groups of the polyol mixture to obtain said NCO-terminated polyurethane prepolymer.

In another aspect, the present invention relates to method for producing a multilayer laminate by laminating at least two films with polyurethane laminating adhesives as described herein.

In a further aspect, the present invention relates to the multilayer laminate obtainable according to the methods described herein.

In yet another aspect, the invention relates to the use of the polyurethane adhesives described herein as laminating adhesives for laminating at least two films, in particular in food packaging applications.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present, but does not mean that only one molecule of said polyol is present. In the present specification, the terms "a" and "an" and "at least one" are the same as the term "one or more" and can be employed interchangeably.

"Laminated films" or "multilayer laminate", as used interchangeably herein, refers to a laminate of two or more film layers, typically plastic films or metal foils, which are bonded together by a laminating adhesive.

In the present application, the term "film" refers to film-shaped substrates such as plastic films, metal foils, paper and cardboard.

If reference is made herein to a molecular weight, this reference refers to the average number molecular weight $M_n$, if not explicitly stated otherwise. The number average molecular weight $M_n$ can be calculated based on end group analysis (OH values according to DIN 53240) or can be determined by gel permeation chromatography according to DIN 55672, in particular DIN 55672-1 with THF as the eluent. If not stated otherwise, all given molecular weights are those determined by gel permeation chromatography according to DIN 55672-1. The weight average molecular weight $M_w$ can be determined by GPC, as described for $M_n$.

The isocyanate content (NCO content) is determined according to DIN EN ISO 11909, if not stated otherwise.

Hydroxy values (OH values) are measured according to DIN EN ISO 4629, if not stated otherwise.

Based on the hydroxyl value and the NCO content the OH/NCO equivalent ratio can be calculated.

All percentages given herein in relation to the compositions or formulations relate to % by weight (wt. %) relative to the total weight of the respective composition or formulation, if not explicitly stated otherwise.

"About" or "approximately" as used herein in connection with a numerical value refers to the numerical value ±10%, preferably ±5%. "About 70° C." thus relates to 70±7, preferably 70±3.5° C.

The present invention is based on the inventor's surprising finding that incorporation of low levels of polybutadiene polyols into polyurethane laminating adhesives significantly increases adhesion on low surface energy films and yields adhesives with superior performance on low energy films compared to conventional polyurethane adhesive systems.

The polyurethane laminating adhesives described herein are either one-component (1K) or two-component (2K) polyurethane adhesives, preferably 2K adhesives. The 1K polyurethane adhesives comprise a polyisocyanate component, while the 2-component polyurethane adhesives comprise a polyisocyanate component in combination with a further component comprising compounds containing at least two H-acidic functional groups. H-acidic functional groups include hydroxyl (—OH), amino (—$NH_2$), mercapto (—SH) or carboxyl (—COON) groups. This further component is preferably a polyol component, i.e. a component comprising polyols that comprise two or more hydroxyl groups per molecule.

The adhesives are preferably liquid at standard conditions (standard ambient temperature and pressure, SATP), i.e. at 25° C. and a pressure of 1013 mbar, but can also be hot melt adhesives. The adhesives may contain solvents, but are preferably free of solvents. The curing of the polyurethane adhesives of the invention is based on the reaction of isocyanate groups with reactive H-acidic functional groups. Alternatively, the isocyanate groups may react with moisture from the applied adhesive, the substrate, or the environment to form urea groups. To accelerate such reactions, catalysts can be present in the adhesive, such as amine or tin catalysts.

The polyurethane laminating adhesives described herein contain an NCO-terminated polyurethane prepolymer. "NCO", as used herein, refers to the isocyanate group —N=C=O. In case the polyurethane laminating adhesive is a 2K adhesive, comprising a binder and a hardener component, the NCO-terminated polyurethane prepolymer forms part of the binder component and the system further comprises a hardener component.

The polyurethane prepolymer is obtainable by reacting a polyol mixture comprising:
  0.1 to 20.0 wt %, preferably 0.5 to 10.0 wt %, relative to the total weight of the polyol mixture of at least one polybutadiene polyol; and
  5.0 to 99.9 wt %, preferably 30.0 to 90.0 wt %, relative to the total weight of the polyol mixture of at least one polyether polyol, wherein the at least one polyether polyol comprises at least one polyether polyol with a number average molecular weight $M_n$ in the range of >1000 g/mol to 10000 g/mol, preferably 1500 to 4000 g/mol;
  with at least one polyisocyanate, wherein the at least one polyisocyanate is used in an amount such that the isocyanate groups are present in molar excess relative to the hydroxyl groups of the polyol mixture to obtain said NCO-terminated polyurethane prepolymer.

In preferred embodiments, the at least one polybutadiene polyol is a polybutadiene diol or triol, preferably a diol. The at least one polybutadiene diol is preferably comprised in the polyol mixture in an amount of 0.2 to 15 wt %, more preferably 0.5 to 10 wt %, yet more preferably 3.0 to 8.0 wt %, especially more preferably 4.0 to 7.0 wt %, most preferably 5.5 to 6.5 wt % relative to the total weight of the polyol mixture. While the type of polybutadiene polyol is not particularly limited, in preferred embodiments, it has a number average molecular weight $M_n$ in the range of 1000 to 10000 g/mol, preferably 1500 to 5000 g/mol. Generally preferred are polybutadiene diols with a number average molecular weight $M_n$ in the range of 1000 to 10000 g/mol, preferably 1500 to 5000 g/mol, more preferably 1700 to 4000, most preferably 2000 to 3000 g/mol. The polybutadiene polyols may be hydrogenated to be completely saturated, i.e. not contain any C=C double bonds, or may still comprise one or more C=C double bonds. It has been found that hydrogenated polybutadiene polyols provide for even higher adhesiveness on low surface energy films than the corresponding non-hydrogenated polybutadiene polyols, so that the hydrogenated polybutadiene polyols are preferred.

Suitable polybutadiene polyols are, for example, commercially available from Cray Valley under the trademark names Poly bd® and Krasol™. Exemplary hydroxyl-terminated polybutadiene resins that may be used in accordance with the invention include, without limitation, Krasol™ HLBH P2000 and Krasol™ LBH P2000.

In preferred embodiments of the invention, the at least one polyether polyol is preferably comprised in 30 to 90 wt %, more preferably in 40 to 85 wt %, even more preferably in 50 to 80 wt %, most preferably in 60 to 75 wt % relative to the total weight of the polyol mixture.

Furthermore, it is preferred, that the at least one polyether polyol preferably comprises 5.0 to 90 wt %, more preferably 10 to 80 wt %, even more preferably 20 to 60 wt %, yet more preferably 25.0 to 50.0 wt %, yet more preferably 30 to 45 wt %, most preferably 30 to 40 wt %, relative to the total weight of the polyol mixture of at least one polyether polyol with a number average molecular weight $M_n$ in the range of >1000 g/mol to 10000 g/mol, preferably 1500 to 4000 g/mol.

The polyether polyols are preferably reaction products of low molecular weight polyfunctional alcohols with alkylene oxides. The alkylene oxides preferably have 2 to 4 carbon atoms. Suitable are, for example and without limitation the reaction products of ethylene glycol, propylene glycol, the isomeric butane diols, pentane diols, and hexane diols with ethylene oxide, propylene oxide or butylene oxide, or mixtures of two or more thereof. Also suitable are the reaction products of polyfunctional alcohols, such as glycerol, trimethylol ethane or trimethylol propane, pentaerythritol or sugar alcohols, or mixtures or two or more thereof, with the above-mentioned alkylene oxides. Also suitable are polyols obtainable by polymerization of tetrahydrofuran (poly-THF). Preferred are however polyalkylene glycol homo- or copolymers, preferably polypropylene glycol homo- or copolymers, polyethylene glycol homo- or copolymers, polytetramethylene glycol homo- or copolymers, or polypropylene glycol/polyethylene glycol block copolymers. Particularly preferred are polypropylene glycol homopolymers.

In preferred embodiments, the polyether polyols have a molecular weight $M_n$ of 400 to 10000 g/mol. However, according to the invention the polyether polyols comprise at least one high molecular weight polyether polyol having a molecular weight $M_n$ of >1000 to 10000, preferably 1500 to 5000 g/mol, more preferably 2000 to 3000 g/mol. Said high molecular weight polyether polyol is, in preferred embodiments, used in amounts 5.0 to 90 wt %, more preferably 10 to 80 wt %, even more preferably 20 to 60 wt %, yet more preferably 25.0 to 50.0 wt %, most preferably 30 to 40 wt % relative to the total weight of the polyol mixture.

The at least one polyether polyol may be a mixture of different polyether polyols including besides the above-defined high molecular weight polyether polyol other polyether polyols with lower molecular weights, for example in the range of between 400 and 1000 g/mol. In preferred embodiments, the polyether polyols used comprise a mixture of a high molecular weight polypropylene glycol having a molecular weight of between 2000 and 3000 g/mol, a medium molecular weight polypropylene glycol, having a molecular weight of about 1000 g/mol, and a low molecular weight polypropylene glycol having a molecular weight of about 400 g/mol. In such embodiments, the high molecular weight polyether polyol may be present in amounts of between 30 to 40 wt %, the medium weight polyether polyol may be present in amounts of between 15 and 30 wt. % and the low molecular weight polyether polyol may be present in amounts of between 5 and 20 wt %, all relative to the total weight of the polyol mixture.

The polyether polyols are preferably diols, more preferably linear, hydroxyl-terminated polyalkylene oxides, such as polypropylene glycol and polyethylene glycol, preferably polypropylene glycol.

In addition to the afore-mentioned polybutadiene polyols and polyether polyols, the polyol mixture may comprise further polyols, such as polyester polyols, polycarbonate polyols, monomeric diols, and the like, all of which are known in the art. In preferred embodiments, the polyol mixture comprises 0.1 to 50 wt %, preferably 5 to 40 wt %, more preferably 10 to 30 wt %, most preferably 15 to 25 wt % relative to the total weight of the polyol mixture of said further polyols. Said additional polyols may comprise hydrophobic polyols, preferably with a hydroxyl functionality of higher than two. In one embodiment, castor oil is employed as an additional polyol component. Castor oil is a triglyceride, wherein about 90% of the fatty acid residues are ricinoleate (12-hydroxy-9-cis-octadecenoic acid), the remaining about 10% predominantly being oleates and linoleates.

The polyols used are preferably liquid at SATP conditions and/or the polyol mixture is liquid at SATP conditions. In preferred embodiments, the polyol mixture is liquid at 40° C. and 1013 mbar.

The polyol mixture is reacted with the at least one polyisocyanate in an amount such that the NCO groups of the at least one polyisocyanate are present in molar excess relative to the hydroxyl groups of the polyol mixture to obtain said NCO-terminated polyurethane prepolymer. The at least one polyisocyanate can be any suitable polyisocyanate, meaning that any compound which includes at least two isocyanate groups is within the contemplation of the present invention. It is preferable, however, that the polyisocyanate be a diisocyanate. Suitable diisocyanates include, without limitation, 1,5-naphthylene diisocyanate (NDI), 2,4'- or 4,4'-diphenylmethane diisocyanate (MDI), hydrogenated MDI (H12MDI), xylylene diisocyanate (XDI), tetramethylxylylene diisocyanate (TMXDI), di- and tetraalkylen-diphenylmethandiisocyanat, 4,4'-dibenzyl diisocyanate, 1,3- or 1,4-phenylene diisocyanate, toluene-2,4-diisocyanate (TDI), 1-methyl-2,4-diisocyanato-cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, methylenetriphenyl triisocyanate (MIT), phthalic acid-bis-isocyanato-ethyl ester, trimethylhexamethylene diisocyanate, 1,4-diisocyanatobutane, and 1,12-diisocyanatododecane.

In preferred embodiments, the polyisocyanates used are selected from methylenediphenyl diisocyanate (MDI), toluene-2,4-diisocyanate (TDI), hexamethylene diisocyanate (HDI), polymeric diphenylmethane diisocyanate (PMDI), isophorone diisocyanate (IPDI), 4,4'-methylenedicyclohexyl diisocyanate (H12MDI) and mixtures thereof. Suitable polyisocyanates are, for example, commercially available under the trademark name Desmodur® from Bayer AG (DE).

The incorporation of small amounts of isocyanate with a functionality higher than two, in particular a triisocyanate, is also contemplated and may under certain circumstances even be advantageous. Such triisocyanates can act as cross-linkers. In this case where the polyisocyanate acts as a cross-linker, polyisocyanates based on hexamethylene diisocyanate are preferred.

At least trifunctional isocyanates are polyisocyanates formed by trimerization or oligomerization of diisocyanates or by reaction of diisocyanates with low molecular weight polyfunctional hydroxyl or amino-containing compounds. Commercially available examples are trimerization products of the isocyanates hexamethylene diisocyanate (HDI) or isophorone diisocyanate (IPDI) or adducts of diisocyanates and low molecular weight triols such as trimethyloipropane or glycerol. Examples are the isocyanurates of HDI and the isocyanurates of IPDI, commercially available under the trademark name Desmodur® N 3300 from Bayer AG and Vestanat® T 1890 from Evonik, respectively. Polyisocyanates based on HDI such as the HDI isocyanurate trimer are preferred.

In principle aliphatic, cycloaliphatic or aromatic isocyanates can be used, but in some embodiments aromatic isocyanates are preferred.

The polyisocyanate is generally used in an amount such that the NCO groups are present in molar excess relative to the OH groups of all polyols present in the reaction mixture, the OH/NCO equivalent ratio preferably being 1:1.1 to 1:5, more preferably 1:1.5 to 1:4.

Providing the polyol mixture may include the step of mixing the polyols and heating the mixture. The heating may be required in case the polyols employed are solid at room temperature and need to be melted to form the polyol mixture. In some embodiments, the polyols are combined and heated to about 30 to 95° C., for example about 40 to 75° C., optionally while stirring the mixture under vacuum to dry. After the mixing, the mixture temperature may be set to 60° C. to 80° C. for the addition of the isocyanates.

The polyol mixture is subsequently combined with at least one polyisocyanate in a reaction mixture to form the prepolymer. The prepolymer reaction usually occurs at elevated temperature, preferably in the range of between about 60° C. and about 95° C., more preferably of between about 70° C. and about 75° C., over a period of between about 1 and about 24 hours. The reaction can be carried out in the presence of a catalyst that is added. The catalyst is preferably selected from tertiary amine catalysts or organometallic catalysts, organotin catalysts being preferred.

Examples of suitable tertiary amine catalysts include N,N-dimethylaminoethanol, tris(dimethyl aminopropyl)amine, N,N-dimethylcyclohexylamine, bis-(2-methyl-aminoethyl)ether, N,N-dimethylbenzylamine, 1,8-diazabicyclo[5.4.0]undec-7-ene (DBU), 1,4-diazabicyclo[2.2.2]octane (DABCO). Triethylamine (TEA), tributylamine, tri-n-propylamine (TPA), N-methylmorpholine, N-ethyl-morpholine, N-coco-morpholine, N,N,N',N'-tetramethyl-ethylene-diamine, N-methyl-N'-dimethyl-amino-ethylpiperazine, N,N-dimethylbenzylamine, bis-(N,N-diethyl-aminoethyl)-adipate, N,N-diethylbenzylamine, pentamethyl-diethylenetriamine, N,N-dimethyl-cyclohexylamine, N,N,N',N'-tetramethyl-1,3-butanediamine, N,N-dimethyl-β-phenylethylamine, 1,2-dimethyl-imidazole, 2-methylimidazole and mixtures thereof.

Examples of suitable organotin catalysts include dibutyltin dilaurate (DBTL), dibutyltin diacetate, or dibutyltin diethylhexanoate; tin oxides such as dibutyltin oxide and dioctyltin oxide.

Preferably a organotin catalyst, more preferably dimethyldineodecanoatetin, such as Fomrez UL28, is employed. In preferred embodiments of the invention, the reaction mixture thus further comprises a catalyst as defined above.

The reaction continues until the free isocyanate content reaches or comes very close to the calculated value, as determined by standard titration with dibutylamine (in accordance with DIN EN ISO 11909). Preferred values for the free isocyanate content in the prepolymer are in the range between 5 and 15 wt %, preferably 8 to 14 wt %, more preferably 10 to 12 wt %, relative to the total amount of polyols and polyisocyanate in the mixture.

In preferred embodiments, the prepolymer has an average number molecular weight $M_n$ of 3000 to 20000 g/mol. The viscosity of the obtained prepolymer may range from about 500 to about 25.000 mPas, preferably 1000 to 8000 mPas, at the application temperature of the adhesive in a temperature range from 20° C. to 100° C. Preferred are viscosities of about 1000 to 8000 mPas as determined by Brookfield RVTDV II, 40° C., spindle 27, rotational speed 20 rpm).

In embodiments where the polyurethane laminating adhesive is a two-component adhesive comprising a binder component and a hardener component, the binder component comprising said NCO-terminated polyurethane prepolymer. In such embodiments, the hardener may be any composition comprising compounds that have H-acidic groups reactive with the terminal NCO groups of the prepolymer, such as hydroxyl, carboxyl, thiol and amine groups.

In some embodiments, the hardener comprises an OH-terminated polyester hardener. Such polyester-based hardeners are known in the art and are, for example, obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid or sebacic acid, phthalic acid, isophthalic acid, terephthalic acid, trimellitic acid, phthalic acid anhydride, tetrahydrophthalic acid anhydride, glutaric acid anhydride, maleic acid, maleic acid anhydride, fumaric acid, dimeric fatty acids and dimethyl terephthalate. Examples of suitable polyols are monoethylene glycol, 1,2-propanediol, 1,3-propanediol, 1,4-butanediol, 3-methyl-pentane-1,5-diol, neopentyl glycol (2,2-dimethyl-1,3-propanediol), 1,6-hexanediol, 1,8-otaneglycol cyclohexanedimethanol, 2-methylpropane-1,3-diol, diethyleneglycol, triethyleneglycol, tetraethyleneglycol, polyethyleneglycol, dipropyleneglycol, tripropyleneglycol, tetrapropyleneglycol, polypropyleneglycol, dibutyleneglycol, tributyleneglycol, tetrabutyleneglycol and polybutyleneglycol. Alternatively, they may be obtained by ring-opening polymerization of cyclic esters, preferably ε-caprolactone. In preferred embodiments, the polyesters are polyesters of adipic acid, isophthalic acid, pimelic acid, suberic acid, azelaic acid and/or sebacic acid with any one or more of neopentyl glycol, 1,4-butane diol, diethyleneglycol, 1,6-hexanediol and 1,2-propanediol. In more preferred embodiments, the polyester hardener comprises at least one hydroxyl-terminated polyester of adipic acid and/or isophthalic acid and any one or more of neopentyl glycol, diethyleneglycol, 1,6-hexane diol and 1,2-propanediol.

In a preferred embodiment, the hardener comprises at least 50 wt %, more preferably at least 70 wt %, even more preferably at least 90 wt %, most preferably at least 100 wt % of at least one OH-terminated polyester relative to the total weight of the hardener composition.

Generally, polyurethane laminating adhesives based on OH-terminated polyester hardeners show an improved laminate adhesion.

In other embodiments, the hardener component may comprise one or more monomeric polyols. Suitable polyols are aliphatic and/or aromatic alcohols having from 2 to 6, preferably 2 to 4 OH groups per molecule. The OH groups may be both primary and secondary. Suitable aliphatic alcohols include, for example, ethylene glycol, propylene glycol, 1,4-butanediol, 1,5-pentanediol, 1,6-hexanediol, 1,7-heptanediol, 1,8-octanediol and higher homologs or isomers. Also suitable are higher alcohols such as glycerol, trimethylolpropane, pentaerythritol and oligomeric ethers of said substances.

In still other embodiments, the hardener component may comprise any one or more of the above described polyether polyols.

Other suitable hardener components include polyacetals, OH-functional polyurethane polyols, and the like. It is also possible to use any two or more of the above hydroxyl-functional hardener components in combination.

The adhesives described herein may additionally contain the usual additives. These include, without limitation and by way of example only, resins (tackifiers), catalysts, such as those given above, stabilizers, crosslinking agents, viscosity modifiers, fillers, pigments, plasticizers, water scavengers, antioxidants and adhesion promoters, such as hydroxyl-, acryloxy-, mercapto-, amino- or epoxy-functional silanes.

1K PU adhesives generally contain one or more of the NCO-functional polyurethane prepolymers described herein. These usually cross-link in the presence of water, which is provided as part of the substrate to be bonded or from the air. 2K PU adhesives contain a binder component that contains the above-described PU prepolymers and a hardener component, as also described above. Immediately before use, the two components are mixed and the resulting mixture has to be processed before it is fully cured.

Preferably, the polyurethane adhesives of the invention are liquid at application temperatures, so that they can be applied in the process for the production of multilayer films in liquid form. It is particularly preferred that the polyurethane adhesives of the invention are liquid at room temperature, but hot-melt adhesives that melt at elevated temperature only, e.g. at 120° C. or 130° C., are also contemplated.

The adhesives described herein may contain solvents or may be solvent-free. Suitable solvents are conventional organic solvents that can evaporate at the temperature up to 130° C., in particular having a boiling point below 100° C. The solvents can be selected from the group of the aliphatic hydrocarbons, aromatic hydrocarbons, ketones or esters. The solvents are used for lowering and adjusting the viscosity. The proportion of solvents can vary within wide limits, for example from 19 to 75 wt %, relative to the total weight of the adhesive. However, it is preferred that the adhesives used are free of solvents, i.e. do not contain more than 5 wt %, preferably not more than 1 wt %, most preferably not more than 0.1 wt % of organic solvents.

The adhesives described herein may be applied to the substrates to be bonded, especially the films, with all conventional devices for adhesive application and with all known application processes, for example, by spraying, coating, roll applicators, and the like. The coating weights applied are typically lower than 1.8 g/m². After application, the substrates to be bonded are bonded together in a known manner. It may be practical to apply the adhesive at elevated temperature to achieve a better application and a faster cross-linking reaction. However, the adhesives described herein show good curing properties already at room temperature or only slightly elevated temperatures such as 40° C.

The polyurethane laminating adhesives described herein can be used in a process to bond well-known films based on polymers such as polypropylene (PP), polyethylene (PE), oriented polypropylene (OPP), OPA, nylon, polyethylene terephthalate (PET), and polyesters as well as metal foils, paper and cardboard.

At least one of the films to be bonded may be a low energy surface film. The low energy surface film may be a plastic film and/or have a surface energy below 38 dyn/cm, preferably in the range of 28 to 38 dyn/cm. Surface energies can be determined by an ink test (in accordance with DIN ISO 8296). Exemplary plastic films having these low surface energies are polyethylene and polypropylene films.

For forming the laminate the adhesive is applied to one or both, preferably only one, of the films to be bonded. The films may be pretreated or printed films. The application can be done at elevated temperature in order to achieve a thin and even coating. A second film of the same or different material is then laminated, typically under pressure. The adhesive cures and a multilayer film in which both films are bonded to each other is obtained. The curing may also occur at elevated temperature. By repeating the laminating process, laminates consisting of more than two layers can be obtained.

Accordingly, the methods according to the invention may comprise the steps of:
 applying the polyurethane laminating adhesive to the surface of one or both films to be laminated;
 contacting the two film surfaces to be laminated;
 optionally repeating steps (a) and (b) to obtain a multilayer structure comprising more than two films; and
 curing the adhesive to form the multilayer laminate.

The invention also encompasses the multilayer films obtained by the described processes and multilayer films in which two or more of the film layers are bonded to each other by the above-described adhesives.

Further, the invention is also directed to the use of the above-described adhesives for laminating at least two films, in particular for food packaging applications. The films may be those defined above in connection with the disclosed methods.

It is of course understood that all embodiments disclosed above in connection with the methods of the invention are similarly applicable to the laminates and uses of the invention and vice versa.

The invention is further illustrated by the following examples, without being limited thereto. Therein, the indicated amounts are by weight, unless otherwise indicated.

EXAMPLES

Example 1

According to the Invention

In a three-necked flask equipped with a stirrer, thermometer and a condenser, 51.64 g of castor oil (OH value 163 mg KOH/g), 51.02 g of PPG 1000 (OH value 110 mg KOH/g), 87.69 g of PPG 2000 (OH value 56 mg KOH/g), 14.03 g of Krasol™ HLBH P2000 (hydrogenated polybutadiene polyol, OH value 50 mg KOH/g), and 31.29 g of PPG 400 (OH value 269 mg KOH/g) were added and mixed at 40° C. Once the mixture of polyols was homogeneous, 200 g MDI were added, and the final composition stirred at 60 to 70° C. until an NCO content of 11.2 wt %. The resulting product showed a viscosity of 6300 mPas at 40° C. (Brookfield—RVTDV II, 40° C., spindle 27, 20 rpm).

The isocyanate component was combined with a hardener (polyester diol based on adipic acid, isophthalic acid, diethylene glycol and 1,2-propylene glycol; OH value between 129 and 141 mg KOH/g) (mixing ratio 100:64 by weight), and the final composition was used to laminate a PE- and a PET-film as well as an OPP- and an OPP-film (OPP=oriented polypropylene) at 40° C., respectively. The surface energy of PET was 44 dyn/cm, of PE 29 dyn/cm and of OPP was 29 dyn/cm.

Laminate adhesion was tested with a universal tensile strength testing machine with a synchronous recorder. The force range was between 10 and 50 N and was adjusted according to the expected adhesion level. For the test, 15 mm wide stripes were prepared using a stripe cutter. Before the stripes were clamped, they were slightly separated. The peeling was done at a rate of 100 mm/minute, a peeling angle of 90° and a peel length of 5 to 10 cm. The result is shown in Table 1 as laminate adhesion in N/15 mm after 2, 7 and 14 days.

TABLE 1

|  | 2 days | 7 days | 14 days |
| --- | --- | --- | --- |
| PE-PET | 0.35 | 0.43 | 0.41 |
| OPP-OPP | 0.98 | 1.3 | 1.26 |

Example 2

According to the Invention

In a three-necked flask equipped with a stirrer, thermometer and a condenser, 33.57 g of castor oil (OH value 163 mg KOH/g), 33.16 g of PPG 1000 (OH value 110 mg KOH/g), 57.00 g of PPG 2000 (OH value 56 mg KOH/g), 9.12 g of Krasol™ LBH P2000 (OH value 50 mg KOH/g), and 20.27 g of PPG 400 (OH value 269 mg KOH/g) were added and mixed at 40° C. Once the mixture of polyols was homogeneous, 130 g MDI were added, and the final composition stirred at 75° C. until an NCO content of 11.6 wt %. The resulting product showed a viscosity of 3050 mPas at 40° C. (Brookfield—RVTDV II, 40° C., spindle 27, 20 rpm).

The isocyanate component was combined with the same hardener as used in Example 1 (mixing ratio 100:65 by weight), and the final composition was used to laminate an OPP- and an OPP-film (OPP=oriented polypropylene) at 40° C.

Laminate adhesion was tested similar as in Example 1 and the results are shown in Table 2 as laminate adhesion in N/15 mm after 3, 7 and 14 days.

TABLE 2

|  | 3 days | 7 days | 14 days |
| --- | --- | --- | --- |
| OPP-OPP | 0.58 | 1.0 | 1.01 |

Example 3 (Comparative Example)

In a three-necked flask equipped with a stirrer, thermometer and a condenser, 14.71 wt % of castor oil (OH value 163 mg KOH/g), 15 wt % of PPG 1000 (OH value 110 mg KOH/g) and 14.22 wt % of PPG 400 (OH value 269 mg KOH/g) were added and mixed at 40° C. Once the mixture of polyols was homogeneous, 56.07 wt % MDI were added, and the final composition stirred at 75° C. until an NCO content of 12.96 wt %. The resulting product showed a viscosity between 3000 and 5000 mPas at 40° C. (Brookfield—RVTDV II, 40° C., Spindle 27, 20 rpm).

The isocyanate component was combined with same hardener as used in Example 1 (mixing ratio 100:75 by weight), and the final composition used to laminate a PE- and a PET-film as well as an OPP- and an OPP-film at 40° C.

Laminate adhesion was tested similar as in Example 1 and the results are shown in Table 3 as laminate adhesion in N/15 mm after 2, 7 and 14 days.

TABLE 3

|  | 2 days | 7 days | 14 days |
| --- | --- | --- | --- |
| PE-PET | 0.02 | 0.03 | 0.02 |
| OPP-OPP | 0.07 | 0.03 | 0.01 |

Example 4 (Comparative Example)

In a three-necked flask equipped with a stirrer, thermometer and a condenser, 52.72 g of castor oil (OH value 163 mg KOH/g), 52.61 g of PPG 1000 (OH value 110 mg KOH/g), 90.82 g of PPG 2000 (OH value 56 mg KOH/g), and 31.95 g of PPG 400 (OH value 269 mg KOH/g) were added and mixed at 40° C. Once the mixture of polyols was homogeneous, 200 g MDI were added, and the final composition stirred at 75° C. until an NCO content of 11.1 wt %. The resulting product showed a viscosity of 4058 mPas at 40° C. (Brookfield—RVTDV II, 40° C., Spindle 27, 20 rpm).

The isocyanate component was combined with same hardener as used in Example 1 (mixing ratio 100:68 by weight), and the final composition used to laminate a PE- and a PET-film as well as an OPP- and an OPP-film film at 40° C.

Laminate adhesion was tested similar as in Example 1 and the results are shown in Table 4 as laminate adhesion in N/15 mm after 2, 7 and 14 days.

TABLE 4

|  | 2 days | 7 days | 14 days |
| --- | --- | --- | --- |
| PE-PET | 0.13 | 0.22 | 0.25 |
| OPP-OPP | 0.17 | 0.25 | 0.22 |

Example 5 (Inventive Example)

In a three-necked flask equipped with a stirrer, thermometer and a condenser, 51.64 g of castor oil (OH value 163 mg KOH/g), 51.02 g of PPG 1000 (OH value 110 mg KOH/g), 87.69 g of PPG 2000 (OH value 56 mg KOH/g), 14.03 g of Krasol™ HLBH P2000 (hydrogenated polybutadiene polyol, OH value 50 mg KOH/g), and 31.29 g of PPG 400 (OH value 269 mg KOH/g) were added and mixed at 40° C. Once the mixture of polyols was homogeneous, 200 g MDI were added, and the final composition stirred at 60 to 70° C. until an NCO content of 11.2 wt %. The resulting product showed a viscosity of 6300 mPas at 40° C. (Brookfield—RVTDV II, 40° C., spindle 27, 20 rpm).

The isocyanate component was combined with a polyether polyol based hardener (PPG 2000), OH value 56 mg KOH/g (mixing ratio 100:133 by weight), and the final composition was used to laminate a PE- and a PET-film as well as an OPP- and an OPP-film at 30° C.

TABLE 5

|  | 3 days | 7 days | 14 days |
| --- | --- | --- | --- |
| PE-PET | 0.025 | 0.04 | 0.04 |
| OPP-OPP | 0.7 | 0.87 | 0.94 |

Example 6 (Comparative Example)

In a three-necked flask equipped with a stirrer, thermometer and a condenser, 52.72 g of castor oil (OH value 163 mg KOH/g), 52.61 g of PPG 1000 (OH value 110 mg KOH/g), 90.82 g of PPG 2000 (OH value 56 mg KOH/g), and 31.95 g of PPG 400 (OH value 269 mg KOH/g) were added and mixed at 40° C. Once the mixture of polyols was homogeneous, 200 g MDI were added, and the final composition stirred at 75° C. until an NCO content of 11.1 wt %. The resulting product showed a viscosity of 4058 mPas at 40° C. (Brookfield—RVTDV II, 40° C., Spindle 27, 20 rpm).

The isocyanate component was combined with a polyether polyol based hardener (PPG 2000), OH value 56 mg KOH/g (mixing ratio 100:136 by weight), and the final composition was used to laminate a PE- and a PET-film as well as an OPP- and an OPP-film at 30° C.

TABLE 6

|  | 3 days | 7 days | 14 days |
| --- | --- | --- | --- |
| PE-PET | 0.014 | 0.013 | 0.01 |
| OPP-OPP | 0.21 | 0.23 | 0.19 |

What is claimed is:

1. A two component polyurethane laminating adhesive comprising a hardener component and a binder component,
   the hardener component comprising a hydroxyl functional polyester of adipic acid and/or isophthalic acid with one or more diol selected from the group consisting of neopentyl glycol, diethyleneglycol, 1,6-hexane diol and 1,2-propanediol;
   the binder component comprising an NCO-terminated polyurethane prepolymer obtained by reacting:
   (a) a polyol mixture comprising:
      0.1 to 20.0 wt. %, relative to the total weight of the polyol mixture of at least one polybutadiene polyol;
      5 to 20 wt. % relative to the total weight of the polyol mixture of at least one polyether polyol having a number average molecular weight of about 400 g/mol;
      30 to 40 wt. % relative to the total weight of the polyol mixture of at least one polyether polyol having a number average molecular weight of about 1,000 g/mol; and
      20 to 60 wt. %, relative to the total weight of the polyol mixture of at least one polyether polyol having a number average molecular weight in the range of 1,500 to 5,000 g/mol; and
   (b) at least one polyisocyanate;
   wherein the at least one polyisocyanate is used in an amount such that the isocyanate groups are present in molar excess relative to the hydroxyl groups of the polyol mixture to obtain said NCO-terminated polyurethane prepolymer.

2. The polyurethane laminating adhesive according to claim 1, wherein the at least one polybutadiene polyol is a hydrogenated polybutadiene polyol.

3. The polyurethane laminating adhesive according to claim 1, wherein the at least one polybutadiene polyol
   (a) is a polybutadiene diol; and/or
   (b) comprised in an amount of 0.2 to 15 wt. %, relative to the total weight of the polyol mixture; and/or
   (c) has a number average molecular weight in the range of 1000 to 10000 g/mol.

4. The polyurethane laminating adhesive according to claim 1, wherein the polyol mixture comprises 55 to 90 wt. % polyether polyols relative to the total weight of the polyol mixture.

5. The polyurethane laminating adhesive according to claim 1, wherein said polyol mixture further comprises castor oil.

6. The polyurethane laminating adhesive according to claim 1, comprising 3 to 8 wt. % of the at least one polybutadiene polyol relative to the total weight of the polyol mixture.

7. A food package for encapsulating and storing a food product, including:
   a multilayer laminate comprising,
      a first layer consisting of a polymer film having a surface energy below 38 dyn/cm,
      a second layer selected from the group consisting of a polypropylene (PP) film, a polyethylene (PE) film, an oriented polypropylene (OPP) film, an oriented polyamide (OPA) film, a nylon film, a polyethylene terephthalate (PET) film, a polyester film, a metalized film and a metal foil, and
      a mixed, two component adhesive disposed between the first layer and the second layer, the two component adhesive comprising a binder component and a hardener component,
      the hardener component comprising a hydroxyl functional polyester of adipic acid and/or isophthalic acid with one or more diol selected from the group consisting of neopentyl glycol, diethyleneglycol, 1,6-hexane diol and 1,2-propanediol;
      the binder component comprising an NCO-terminated polyurethane prepolymer obtained by reacting:
         (a) a polyol mixture comprising:
            0.1 to 20.0 wt. %, relative to the total weight of the polyol mixture of at least one polybutadiene polyol;
            5 to 20 wt. % relative to the total weight of the polyol mixture of at least one polyether polyol having a number average molecular weight of about 400 g/mol;
            30 to 40 wt. % relative to the total weight of the polyol mixture of at least one polyether polyol having a number average molecular weight of about 1,000 g/mol; and
            20 to 60 wt. %, relative to the total weight of the polyol mixture of at least one polyether polyol having a number average molecular weight in the range of 1,500 to 5,000 g/mol; and
         (b) at least one polyisocyanate;
      wherein the at least one polyisocyanate is used in an amount such that the isocyanate groups are present in molar excess relative to the hydroxyl groups of the polyol mixture to obtain said NCO-terminated polyurethane prepolymer.

8. The food package of claim 7, wherein the wherein the hardener component comprises a hydroxyl-terminated polyester.

9. The food package of claim 7 wherein the first layer and the second layer are bonded together by cured reaction products of the two component adhesive.

10. The food package of claim 7 enclosing a food product.

11. The food package according to claim 7, wherein the polyol mixture further comprises castor oil.

12. The food package according to claim 7, comprising 3 to 8 wt. % of the at least one polybutadiene polyol relative to the total weight of the polyol mixture.

13. A method for producing a multilayer laminate by laminating at least two films with a polyurethane laminating adhesive according to claim 1.

14. The method according to claim 13, wherein at least one of the films is a low energy surface film.

15. The method according to claim 13, wherein at least one of the films is a low energy surface film and the low energy surface film
   (a) is a plastic film; and/or
   (b) has a surface energy below 38 dyn/cm; and/or
   (c) is a polyethylene film, a polypropylene film or a metallized film.

16. A method for producing a multilayer laminate comprising the steps of:
   (a) applying the polyurethane laminating adhesive according to claim 1 to the surface of one or both films to be laminated;
   (b) contacting the two film surfaces to be laminated;
   (c) optionally repeating steps (a) and (b) to obtain a multilayer structure comprising more than two films; and
   (d) curing the adhesive to form the multilayer laminate.

* * * * *